US008087273B2

(12) United States Patent
Liu et al.

(10) Patent No.: US 8,087,273 B2
(45) Date of Patent: Jan. 3, 2012

(54) LOCK WITH A SUPPORT STRUCTURE

(75) Inventors: Cheng-Chung Liu, Chiayi County (TW); Chia-Min Sun, Chiayi (TW)

(73) Assignee: Tong Lung Metal Industry Co., Ltd., Chia-Yi (TW)

( * ) Notice: Subject to any disclaimer, the term of this patent is extended or adjusted under 35 U.S.C. 154(b) by 318 days.

(21) Appl. No.: 12/560,932

(22) Filed: Sep. 16, 2009

(65) Prior Publication Data

US 2010/0064745 A1 Mar. 18, 2010

(30) Foreign Application Priority Data

Sep. 17, 2008 (TW) .............................. 97216841 U

(51) Int. Cl.
*B60R 25/02* (2006.01)

(52) U.S. Cl. .......................... 70/224; 292/347; 292/352

(58) Field of Classification Search .................... 70/224; 292/347, 348, 352
See application file for complete search history.

(56) References Cited

U.S. PATENT DOCUMENTS 3,212,306 A * 10/1965 Russell et al. .................. 70/224
3,337,254 A * 8/1967 Russell et al. ................ 292/352
4,394,821 A * 7/1983 Best et al. ....................... 70/422
5,077,994 A 1/1992 Trull et al.
5,301,526 A * 4/1994 Fann et al. ...................... 70/224
5,782,119 A * 7/1998 Ellis et al. ...................... 70/371
5,941,108 A * 8/1999 Shen .............................. 70/467
6,099,053 A * 8/2000 Huang ...................... 292/336.3
6,470,721 B2 * 10/2002 Ming .............................. 70/224
6,568,727 B2 * 5/2003 Adelmeyer .................. 292/348
7,143,477 B2 12/2006 Dalsing et al.
7,156,432 B2 1/2007 Sledge et al.
7,581,421 B2 9/2009 Don et al.
2002/0105194 A1 * 8/2002 Huang .......................... 292/347
2006/0244272 A1 11/2006 Roth et al.
2007/0051144 A1 3/2007 Huang et al.

* cited by examiner

*Primary Examiner* — Suzanne Barrett
(74) *Attorney, Agent, or Firm* — Chun-Ming Shih

(57) ABSTRACT

A lock with a support structure includes a tubular element connected to a handle having a positioning hole and a center hole. The center hole contains a lock set having a rotatable lock core connected to a transmission element. The transmission element has separated first and second sides. A transversally slidable element is installed to the tubular element for receiving a bias pressure of an elastic element, and includes a protruding portion and a bearing portion. The protruding portion can be moved between engaged and non-engaged positions of the positioning hole of the handle. The support structure includes a support portion. If the first side of the transmission element approaches the support portion of the support structure, the bearing portion of the transversally slidable element will approach the second side of the transmission element for limiting the displacement of the transversally slidable element when an external force is applied.

9 Claims, 4 Drawing Sheets

LOCK WITH A SUPPORT STRUCTURE

BACKGROUND OF THE INVENTION

1. Field of the Invention

The present invention relates to a lock, and more particularly to a door lock with a support structure installed in a tubular element for supporting a transmission element.

2. Description of the Related Art

In general, a conventional lock includes: a handle installed on a tubular element of the lock, and a transversally slidable element movably connected to the tubular element, supported by an elastic element, and engaged with a positioning hole of the handle. In addition, the handle includes a penetrating hole for accommodating a lock set, and the lock set is coupled to a transmission element, and the transmission element is provided for selectively limiting a movement of the transversally slidable element when the transmission element is situated at a lock state and not limiting the movement of the transversally slidable element when the transmission element is situated at an unlock state. However, if the handle is removed, it is necessary to set the transmission element of the lock to the unlock state and press the transversally slidable element on the tubular element by a hand tool (or a small slender plate), so that the transversally slidable element of the tubular element is separated from the positioning hole of the handle to achieve the effect of removing the handle. However, the conventional lock has the following drawback. Although the transmission element of the lock can abut the transversally slidable element when the transmission element is situated at the lock state, yet there is a gap existed at a position where a lock core is connected with the transmission element, and the transmission element may be shaken easily. If a hand tool (or a small slender plate) is used for pressing the transversally slidable element of the tubular element or an improper external force is applied to the position of the transversally slidable element, the transmission element will be shaken and cannot support the transversally slidable element, so that the transversally slidable element will be pressed and shifted, resulting in a separation of the transversally slidable element from the positioning hole of the handle, and a separation of the handle from the tubular element.

A search of prior art records has unveiled the following patents or published patent applications:

1. U.S. Pat. No. 5,077,994 issued in 1992 to Trull et al.;
2. U.S. Pat. No. 7,143,477 issued in 2006 to Dalsing et al.;
3. U.S. Pat. No. 7,156,432 issued in 2007 to Sledge et al.;
4. U.S. Pat. No. 7,581,421 issued in 2009 to Don et al.;
5. U.S. Pub. No. 2006/0244272 published in Nov. 2, 2006; and
6. U.S. Pub. No. 2007/0051144 published in Mar. 8, 2007.

SUMMARY OF THE INVENTION

Therefore, it is a primary objective of the present invention to provide a lock with a support structure, wherein if a transmission element of a lock is situated at a lock state, the transmission element of the lock will be supported, and movement of the transversally slidable element will be limited.

To achieve the foregoing objective, the present invention provides a lock with a support structure, comprising: a tubular element, connected to a handle, and the handle having a positioning hole and a center hole, and the center hole of the handle being provided for accommodating a lock set, and the lock set having a rotatable lock core, and the lock core being coupled to a transmission element, and the transmission element having a first side and a second side disposed separately from each other; a transversally slidable element, installed at a transverse position of the tubular element, for receiving a bias pressure of an elastic element, and the transversally slidable element having a protruding portion and a bearing portion, and the protruding portion of the transversally slidable element movable between an engaged position and a non-engaged position of the positioning hole of the handle; and a support structure, installed in the tubular element, and having a support portion, such that if the first side of the transmission element is positioned adjacent to the support portion of the support structure, the second side of the transmission element will be positioned adjacent to the bearing portion of the transversally slidable element, such that the movement of the transversally slidable element can be limited when an external force is applied to the transversally slidable element.

In another preferred embodiment of the present invention, the support structure is a ring having a center hole disposed at the center of the ring and provided for passing the transmission element.

In another preferred embodiment of the present invention, the ring is capable of receiving a bias pressure of a spring, such that a side of the ring is positioned adjacent to a side of the transversally slidable element.

In another preferred embodiment of the present invention, the ring is capable of receiving a bias pressure of a spring, such that a side of the ring is positioned adjacent to a pushing portion of the lock core.

In another preferred embodiment of the present invention, the transmission element is connected integrally to the lock core to form as a transmission unit and the ring is disposed around the outer diameter of the lock core.

In another preferred embodiment of the present invention, the ring has an external circular surface, and the tubular element has an internal tubular wall, such that when the ring is installed in the tubular element, the external circular surface of the ring is positioned adjacent to the internal tubular wall of the tubular element.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
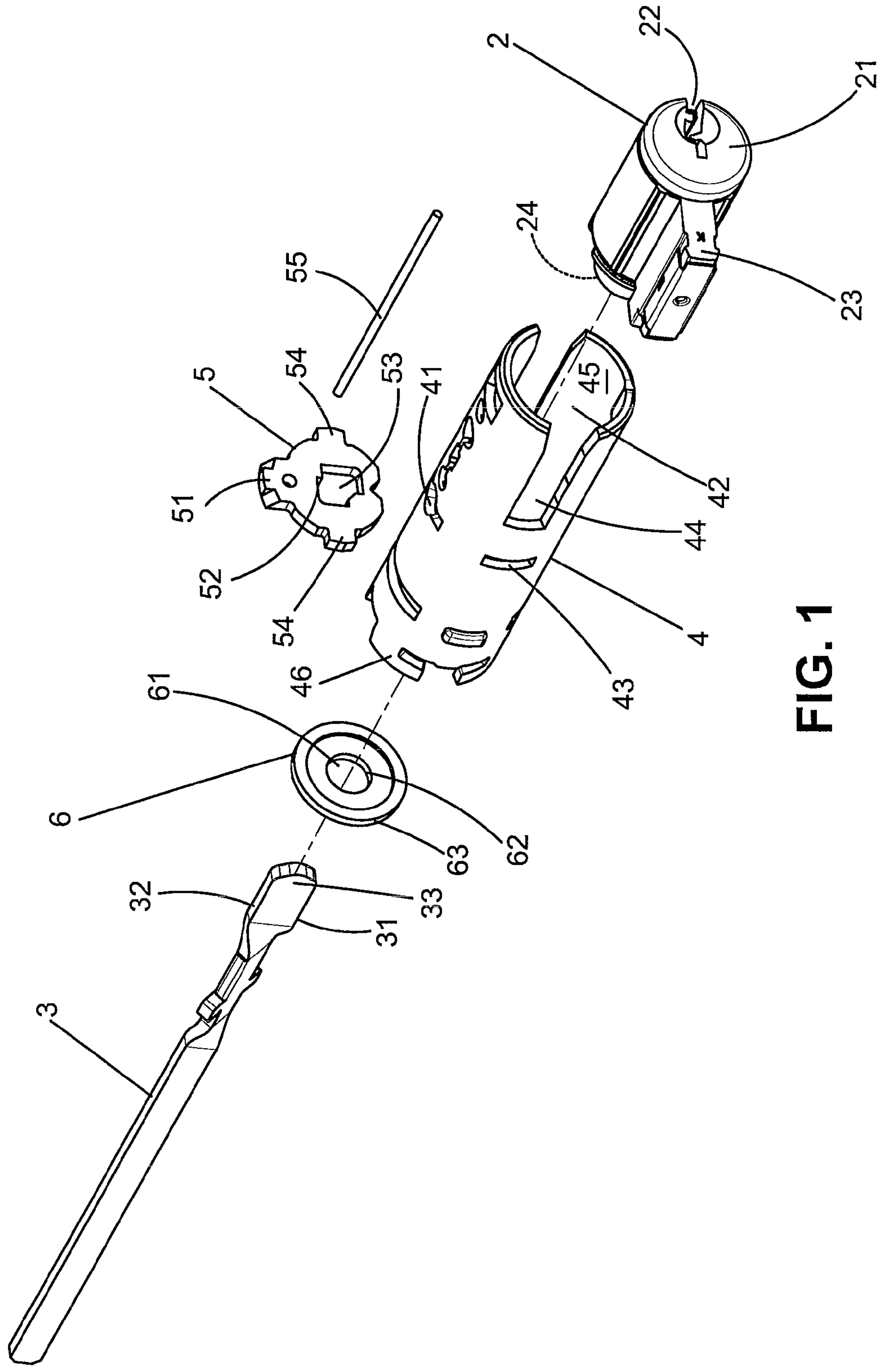
FIG. 1 is an exploded view of a preferred embodiment of the present invention, showing a lock set, a tubular element, a support structure, a transmission element, a transversally slidable element and an elastic element.

With reference to FIGS. 1 to 5 for a lock with a support structure in accordance with a preferred embodiment of the present invention, the support structure is a ring 6 installed in a tubular element 4 of the lock 9, and the tubular element 4 is connected to a handle 1, and the handle 1 has a positioning hole 12 and a center hole 11, and the center hole 11 of the handle 1 is provided for accommodating a lock set 2. The handle 1 is formed as a knob in this embodiment. Alternatively, the handle 1 may be configured as a handle level or level (not shown).

The lock 9 includes other components (not shown), such as for example, a door latch bolt and an internal side of a lock, which for brevity will not discussed herein, since such components are well known to those of ordinary skill in the art, and their description is not necessary to the understanding of the present invention.

The lock set 2 includes a rotatable lock core 21, and the lock core 21 includes a pushing portion 24 disposed at an end of the lock core 21, and a key hole 22 penetrating through the lock core 21 for inserting and receiving a correct key (not shown in the figure) to drive the lock core 21 to rotate, and the lock set 2 includes a protruding bar 23.

Figure 2:
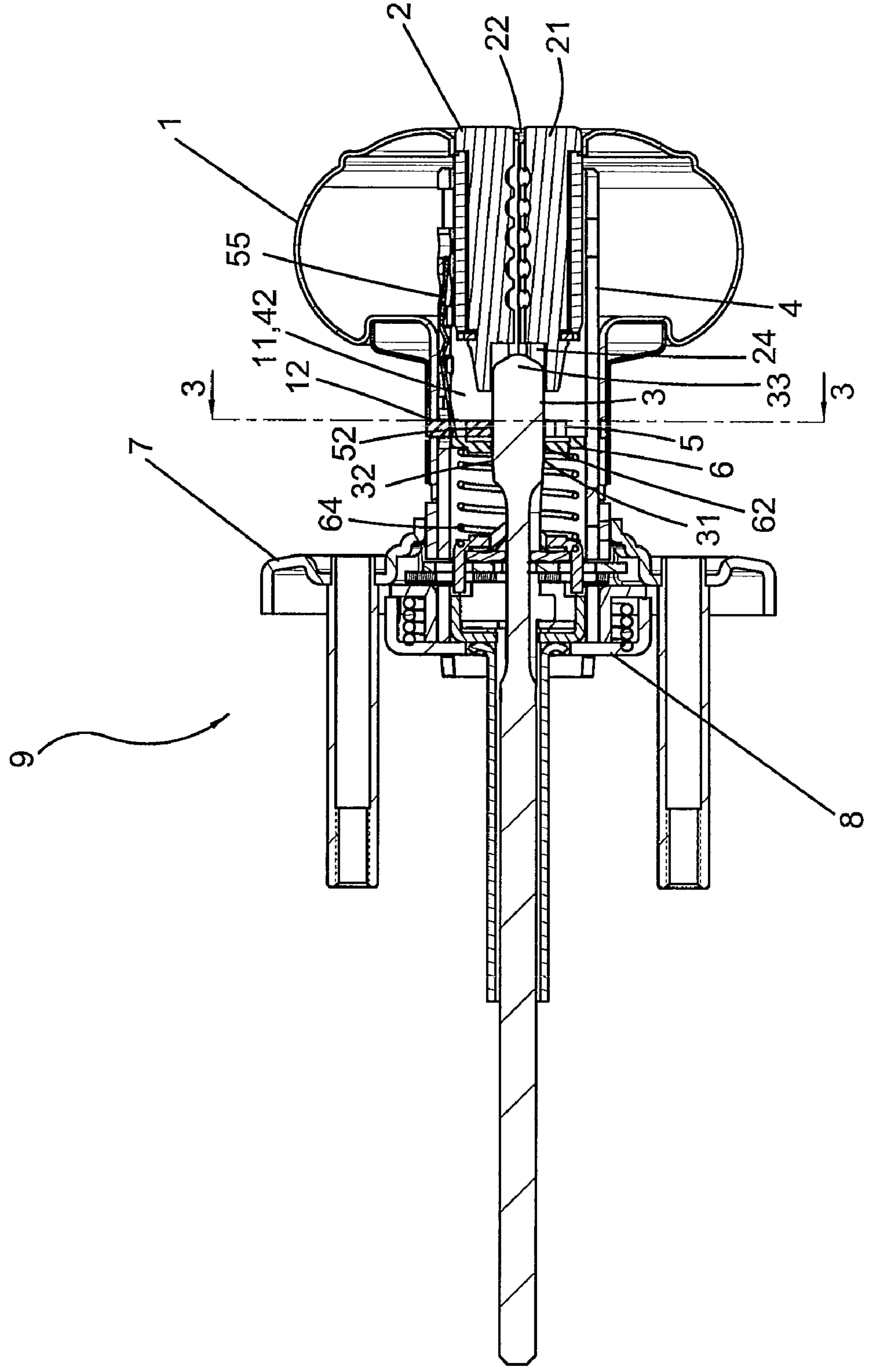
FIG. 2 is a sectional view of a preferred embodiment of the present invention, showing an external side of a lock, when a transmission element is situated at a lock state.
Figure 5:
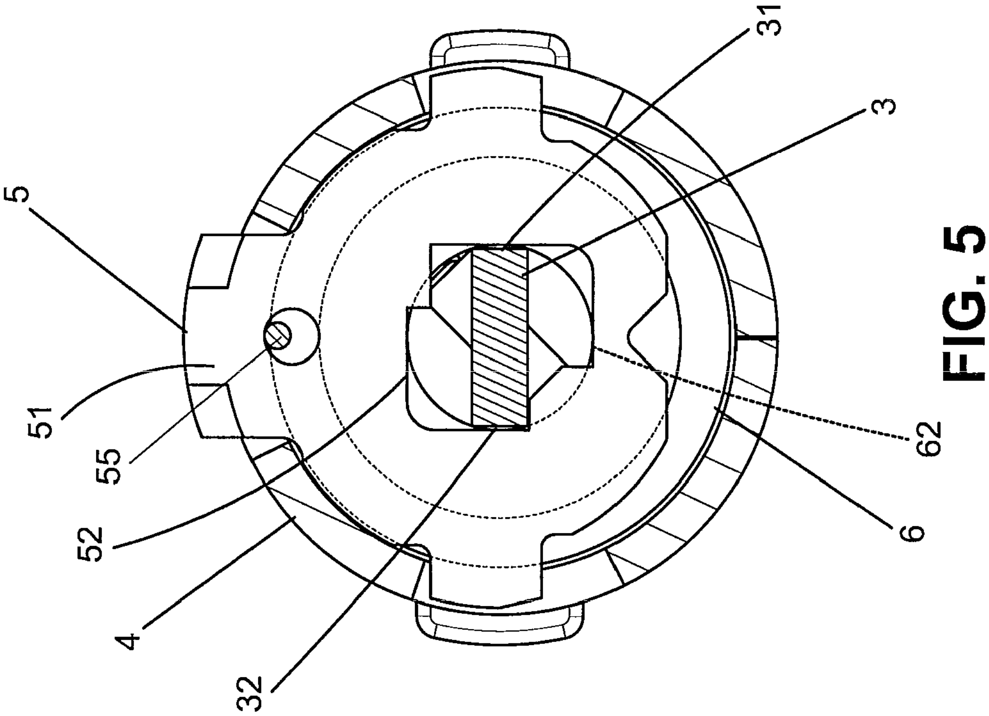
FIG. 5 is a cross-sectional view taken along line 5-5 of FIG. 4, showing a tubular element, a support structure, a transmission element and a transversally slidable element, when the transmission element is situated at a unlock state.
Figure 3:
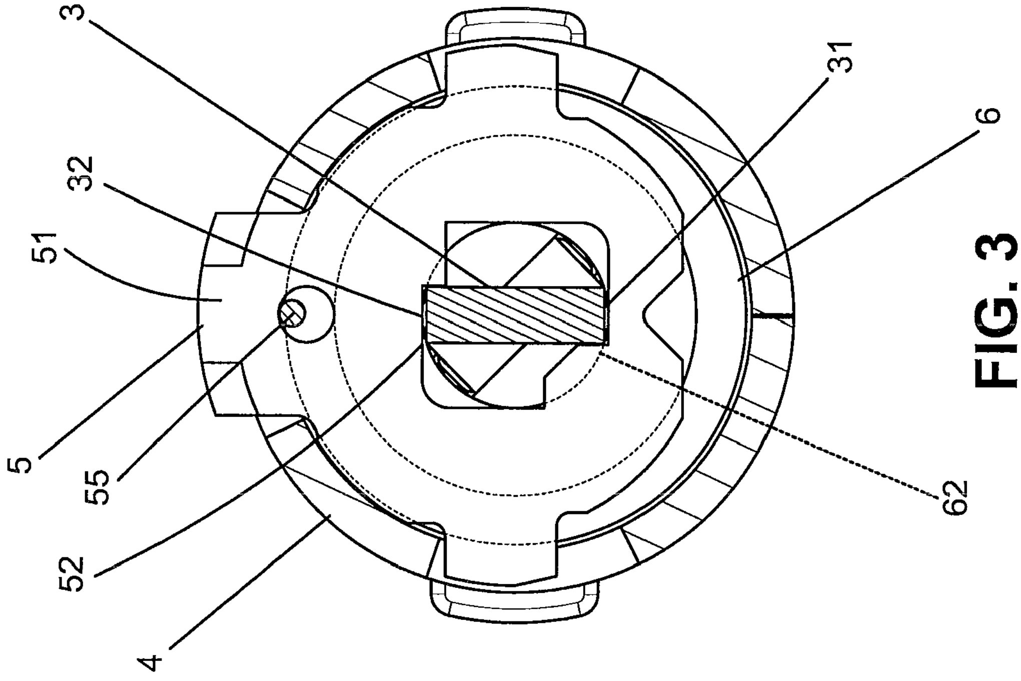
FIG. 3 is a cross-sectional view taken along line 3-3 of FIG. 2, showing a tubular element, a support structure, a transmission element and a transversally slidable element, when the transmission element is situated at a lock state.
Figure 4:
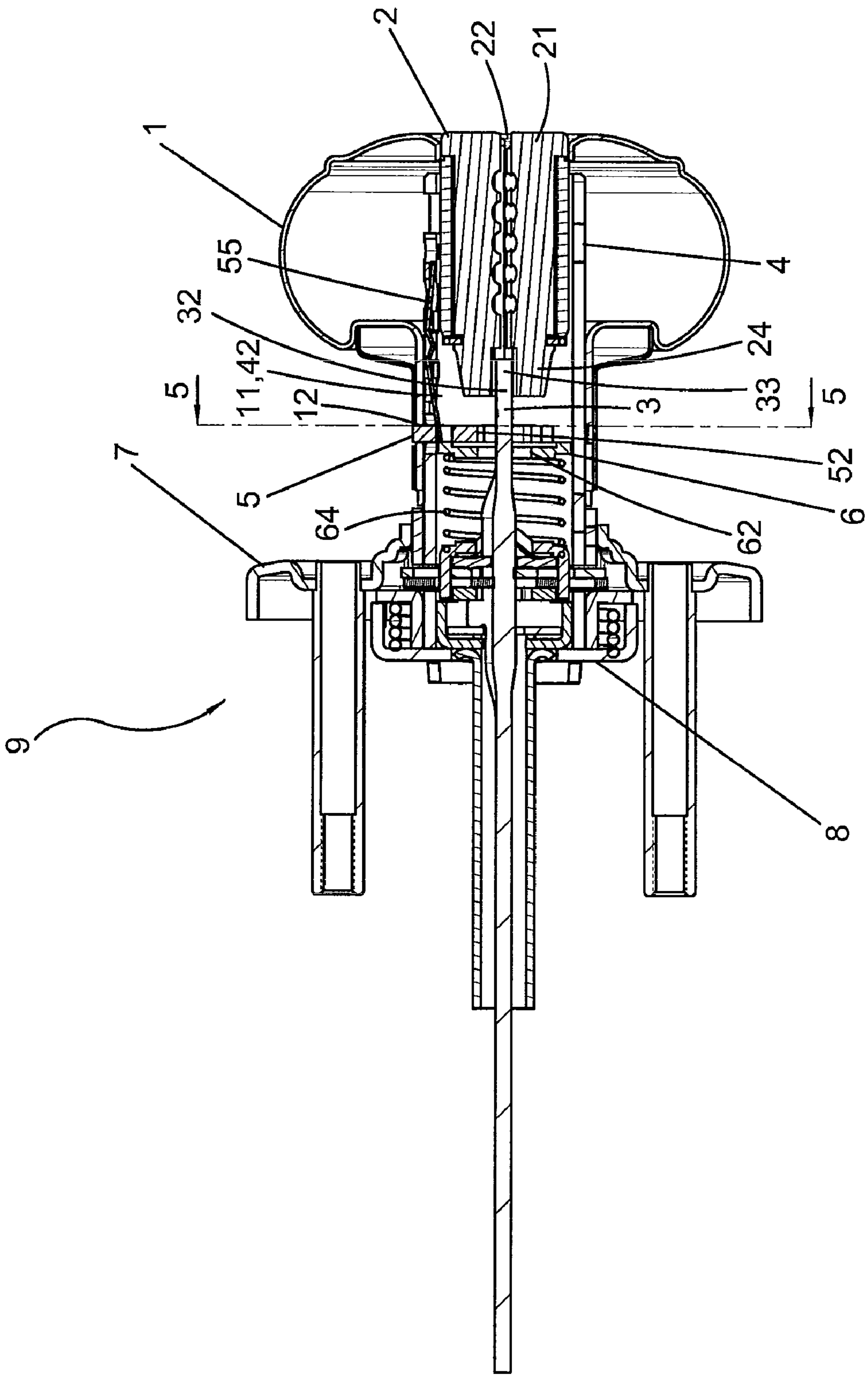
FIG. 4 is a sectional view of a preferred embodiment of the present invention, showing an external side of a lock, when a transmission element is situated at an unlock state.

A transmission element 3 includes a first side 31 and a second side 32 disposed separately from each other, and a transmission portion 33 of a approximately rectangular cross-section disposed at an end of the transmission element 3, the first side 31 and the second side 32 disposed at the approximately rectangular transmission portion 33 separately, wherein the transmission element 3 can be connected to the lock core 21 such that a pushing portion 24 of the lock core 21 can push the transmission portion 33 of the transmission element 3 to rotate the transmission element 3 to a first angular position for a lock state (as shown in FIGS. 2 and 3) or a second angular position for an unlock state (as shown in FIGS. 4 and 5).

The tubular element 4 is rotatably installed at a cover disc 7 (as shown in FIG. 2), and the tubular element 4 has a center hole 42, and at least one side slot 44 disposed at an end of the tubular element 4. The tubular element 4 can be inserted into the center hole 11 of the handle 1, such that the protruding bar 23 of the lock set 2 is contained in the side slot 44 of the tubular element 4, such that the tubular element 4, the lock set 2, the handle 1 are coupled with one another. The tubular element 4 further has an extension portion 46 disposed at another end of the tubular element 4 and engaged with a torque resilience mechanism 8 for linking the tubular element 4 with the torque resilience mechanism 8, and the tubular element 4 has an opening 41 disposed at a middle tubular wall and two lateral holes 43, and forming an internal tubular wall 45 of the tubular element 4.

A transversally slidable element 5 has a penetrating hole 53 provided for passing and receiving the transmission element 3 and installed at a transverse position in the tubular element 4 for receiving a bias pressure of an elastic element 55. The elastic element 55 is disposed inside the tubular element 4 to bias the transversally slidable element 5 so that a protruding portion 51 of the transversally slidable element 5 projects out of the tubular element 4 and extends into the positioning hole 12. The transversally slidable element 5 further has a bearing portion 52 and two lateral protruding portion 54, wherein the protruding portion 51 is passed through the opening 41 of the tubular element 4 and capable of selectively moving to a first position of engaging the positioning hole 12 of the handle 1 or a second position of not engaging the positioning hole 12 of the handle 1, and the two lateral protruding portions 54 of the transversally slidable element 5 can be slid in the two lateral holes 43 of the tubular element 4 respectively.

The ling 6 has a center hole 61 and an external circular surface 63 approximately concentric with the center hole 61, and the center hole 61 has a support portion 62 formed at the periphery of the center hole 61, and an internal tubular wall 45 of the tubular element 4 is positioned adjacent to the external circular surface 63 of the ring 6, and the ring 6 is provided for receiving a bias pressure of a spring 64, such that a side of the ring 6 can be positioned adjacent to a side of the transversally slidable element 5.

With reference to FIGS. 4 and 5, if the transmission element 3 is situated at a second angular position for the unlock state, the second side 32 of the transmission element 3 will not be positioned adjacent to the bearing portion 52 of the transversally slidable element 5, so that a hand tool (or a small slender plate) can be inserted into the positioning hole 12 of the handle 1 to push the protruding portion 51 of the transversally slidable element 5 to set the transversally slidable element 5 at a position of not engaging the positioning hole 12 of the handle 1, so as to remove the handle 1 to facilitate an operation of replacing the lock set 2.

With reference to FIGS. 2 and 3, if the transmission element 3 is situated at a first angular position for a lock state, the second side 32 of the transmission element 3 will be positioned adjacent to the bearing portion 52 of the transversally slidable element 5, and the first side 31 of the transmission element 3 will be positioned adjacent to the support portion 62 of the ring 6, such that a hand tool (or a small slender plate) can be inserted into the positioning hole 12 of the handle 1 to push the protruding portion 51 of the transversally slidable element 5. Since the bearing portion 52 of the transversally slidable element 5 and the second side 32 of the transmission element 3 are in contact with each other, the support portion 62 of the ring 6 and the first side 31 of the transmission element 3 are positioned adjacent to each other, therefore the first side 31 of the transmission element 3 is supported by the support portion 62 of the ring 6, such that the transmission element 3 cannot be moved transversally to prevent the protruding portion 51 of the transversally slidable element 5 from moving from a position of engaging the positioning hole 12 of the handle 1 to a position of not engaging the positioning hole 12 of the handle 1, so as to prevent a thief from removing the handle 1 to unlock the lock.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A lock with a support structure, comprising:

a tubular element, coupled to a handle, and said handle having a positioning hole and a center hole, and said center hole of said handle being provided for accommodating a lock set, and said lock set having a rotatable lock core, and said lock core being coupled to a transmission element, and said transmission element having a first side and a second side separated from each other;

a transversally slidable element, installed at a transverse position of said tubular element, for receiving a bias pressure of an elastic element, and said transversally slidable element having a protruding portion and a bearing portion, and said protruding portion of said transversally slidable element being capable of selectively moving to an engaged position and a non-engaged position of said positioning hole of said handle; and a support structure, installed in said tubular element, and having a support portion, such that when said first side of said transmission element is positioned adjacent to said support portion of said support structure, said second side of said transmission element is positioned adjacent to said bearing portion of said transversally slidable element, such that the movement of said transversally slidable element is limited when an external force is applied to said transversally slidable element, wherein said support structure is a ring having a center hole disposed at the center of said ring and provided for passing said transmission element.

2. The lock with a support structure as recited in claim 1, wherein said ring is capable of receiving a bias pressure of a spring, such that a side of said ring is positioned adjacent to a side of said transversally slidable element.

3. The lock with a support structure as recited in claim 1, wherein said ring has an external circular surface, and said tubular element has an internal tubular wall, such that when said ring is installed in said tubular element, said external circular surface of said ring is positioned adjacent to said internal tubular wall of said tubular element.

4. A lock with a support structure, comprising:

a tubular element, coupled to a handle, and said handle having a positioning hole and a center hole, and said center hole of said handle being provided for accommodating a lock set, and said lock set having a rotatable lock core, and said lock core being coupled to a transmission element, and said transmission element having a first side and a second side separated from each other;

a transversally slidable element, installed at a transverse position of said tubular element, for receiving a bias pressure of an elastic element, and said transversally slidable element having a protruding portion and a bearing portion, and said protruding portion of said transversally slidable element being capable of selectively moving to an engaged position and a non-engaged position of said positioning hole of said handle; and a ring, installed in said tubular element, and having a center hole disposed at the center of said ring and provided for passing said transmission element, and said ring further having an external circular surface approximately concentric with said center hole of said ring and a support portion formed at the periphery of said center hole of said ring, such that when said first side of said transmission element is positioned adjacent to said support portion of said ring, said second side of said transmission element is positioned adjacent to said bearing portion of said transversally slidable element, such that the movement of said transversally slidable element is limited when an external force is applied to said transversally slidable element.

5. The lock with a support structure as recited in claim 4, wherein said ring is capable of receiving a bias pressure of a spring, such that a side of said ring is positioned adjacent to a side of said transversally slidable element.

6. The lock with a support structure as recited in claim 4, wherein said tubular element has an internal tubular wall, such that when said ring is installed in said tubular element, said external circular surface of said ring is positioned adjacent to said internal tubular wall of said tubular element.

7. A lock with a support structure, comprising:

a tubular element, coupled to a handle, and said handle having a positioning hole and a center hole, and said center hole of said handle being provided for accommodating a lock set, and said lock set having a rotatable lock core, and said lock core being coupled to a transmission element, and said transmission element having a approximately rectangular transmission portion, and a first side and a second side disposed at said approximately rectangular transmission portion separately;

a transversally slidable element, installed at a transverse position of said tubular element, for receiving a bias pressure of an elastic element, and said transversally slidable element having a protruding portion and a bearing portion, and said protruding portion of said transversally slidable element being capable of selectively moving to an engaged position and a non-engaged position of said positioning hole of said handle; and a ring, installed in said tubular element, and having a center hole disposed at the center of said ring and provided for passing said transmission element, and said ring further having an external circular surface approximately concentric with said center hole of said ring and a support portion formed at the periphery of said center hole of said ring, such that when said first side of said transmission element is positioned adjacent to said support portion of said ring, said second side of said transmission element is positioned adjacent to said bearing portion of said transversally slidable element, such that the movement of said transversally slidable element is limited when an external force is applied to said transversally slidable element.

8. The lock with a support structure as recited in claim 7, wherein said ring is capable of receiving a bias pressure of a spring, such that a side of said ring is positioned adjacent to a side of said transversally slidable element.

9. The lock with a support structure as recited in claim 7, wherein said tubular element has an internal tubular wall, such that when said ring is installed in said tubular element, said external circular surface of said ring is positioned adjacent to said internal tubular wall of said tubular element.

* * * * *